(12) United States Patent
Dragoi

(10) Patent No.: US 7,520,562 B2
(45) Date of Patent: Apr. 21, 2009

(54) SUPPORTING MEMBER FOR A FENDER

(75) Inventor: Cristian Dragoi, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/180,635

(22) Filed: Jul. 14, 2005

(65) Prior Publication Data
US 2006/0017272 A1 Jan. 26, 2006

Related U.S. Application Data

(63) Continuation of application No. PCT/EP03/14164, filed on Dec. 12, 2003.

(30) Foreign Application Priority Data

Jan. 15, 2003 (DE) ................................ 103 01 183

(51) Int. Cl.
*B62D 25/16* (2006.01)
(52) U.S. Cl. .................... 296/198; 296/193.11; 296/29; 296/193.04
(58) Field of Classification Search ................. 296/191, 296/193.05, 198, 193.11, 29, 193.04, 193.07, 296/187.08
See application file for complete search history.

(56) References Cited

U.S. PATENT DOCUMENTS 2,974,977 A 3/1961 Herron 5,466,035 A * 11/1995 Klages et al. ............... 296/205
6,824,199 B2 * 11/2004 Weik et al. ............. 296/187.04
2001/0019216 A1 * 9/2001 Kobayashi .................. 296/204

FOREIGN PATENT DOCUMENTS

| DE | 18 37 429 U | 6/1961 |
| DE | 29 11 610 A | 9/1980 |
| EP | 1 153 823 A | 11/2001 |
| JP | 7-291147 | 11/1995 |
| JP | 2004050865 A * | 2/2004 |
| JP | 2004168261 A * | 6/2004 |

OTHER PUBLICATIONS

Machine Translation of JP 7-291147, Jan. 2008.*

* cited by examiner

*Primary Examiner*—Jason S Morrow
(74) *Attorney, Agent, or Firm*—Crowell & Moring LLP

(57) ABSTRACT

In the case of vehicle variants of one "vehicle family", different fenders and different front opening hoods adjoining the fenders are attached to forward vehicle structures by means of identical supporting members. For this purpose, the supporting members have connection planes for the upper end sections of the fenders, which are situated horizontally above one another. Thus, a different course of the joints, such as between a fender and an opening hood, and differently shaped body panels can be achieved in the case of vehicle variants at comparatively low cost by use of this common supporting member.

14 Claims, 2 Drawing Sheets

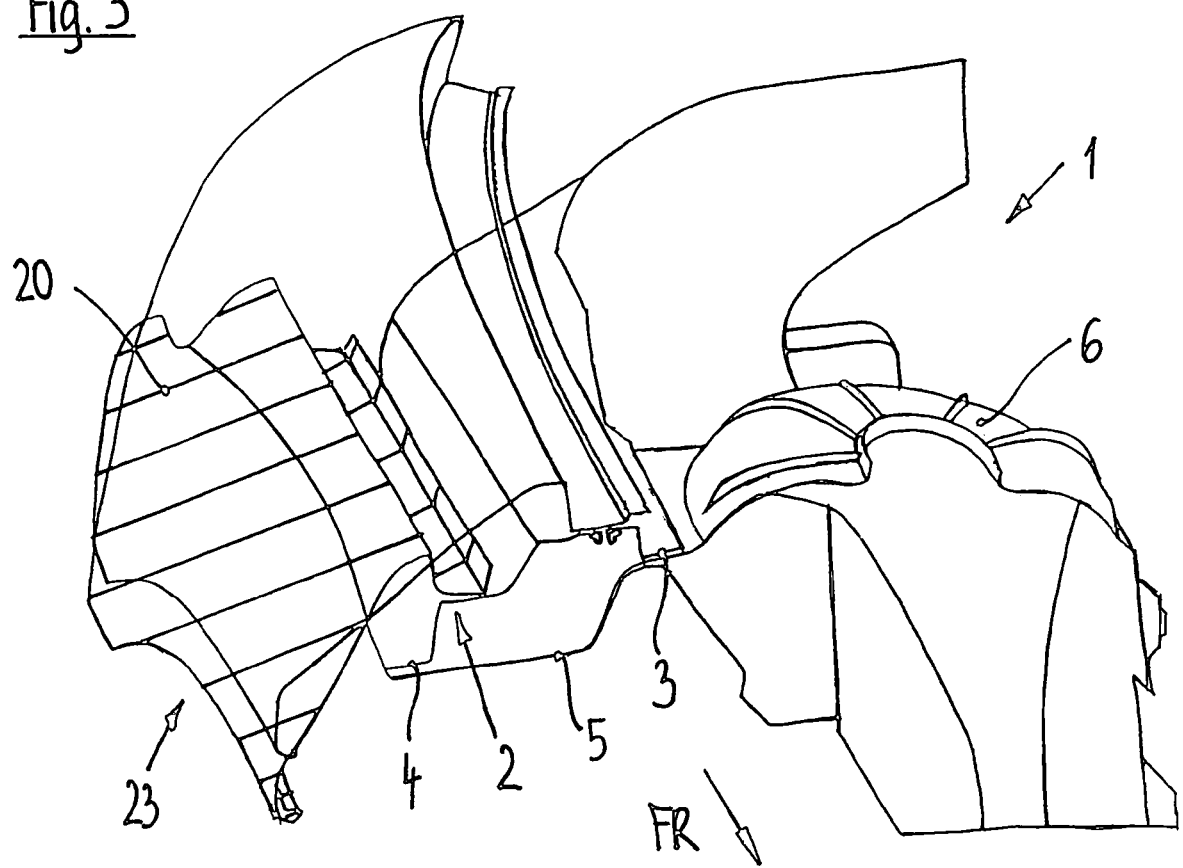
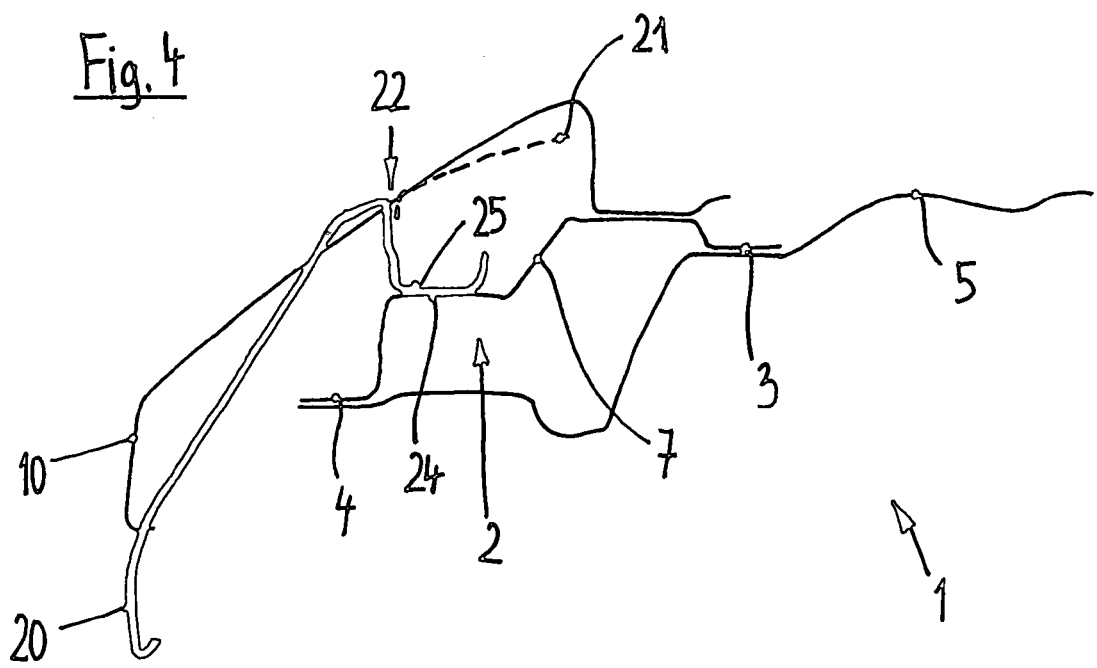

SUPPORTING MEMBER FOR A FENDER

BACKGROUND AND SUMMARY OF THE INVENTION

This application is a continuation of International Patent Application No. PCT/EP03/14164 filed on Dec. 12, 2003, designating the United States of America, the entire disclosure of which is incorporated herein by reference. Priority is claimed based on German Patent Application No. DE 103 01 183.8 filed on Jan. 15, 2003, the disclosure of which is expressly incorporated by reference herein.

The invention relates to a supporting member for a fender of a vehicle, as described, for example, in German Patent Document DE 41 83 392 A1 (corresponding U.S. Pat. No. 5,466,035), as well as to a plurality of vehicle variants having such a supporting member.

It is an object of the invention to indicate a process by which, particularly in the case of variants within a vehicle series, a different exterior appearance of a vehicle is achieved while the development costs and manufacturing costs are as low as possible.

This object is achieved according to certain preferred embodiments of the invention by providing a supporting member for a fender of a motor vehicle, characterized in that the supporting member has at least two mutually offset connection areas on which the upper end areas of at least two different fenders can be mounted.

In this case, it is a core idea to further develop a supporting member for a fender such that it has at least two different connection areas for fastening a fender. Thus, uniform supporting members can be used for two or more vehicle variants which differ with respect to their exterior at least in the area of the fender and/or of the front opening hood. This results in a reduction of the variety of parts, connected with a lowering of the manufacturing costs because the logistics in the vehicle body shell are simplified and the production of the supporting members is less expensive in larger piece numbers.

As a result of the fastening of the fenders of the individual vehicle variants to different connection areas of the uniform supporting member, a different course of the joints between the fender and the front opening hood is obtained for the vehicle variants, which, together with the different exterior shape of the fenders and the front opening hoods decisively influences the exterior appearance of a vehicle.

The invention can be used with considerable advantages particularly in the case of "derivatives" within a vehicle series which differ, for example, in the shape of their vehicle body (sedan, coupe, fast back, combination model, convertible, roadster). By means of the invention, it therefore particularly becomes possible to produce derivatives within one "vehicle family" of a different exterior appearance. Another field of application relates, for example, to model redesigns of vehicles in the case of which the exterior appearance is to be changed at costs which are as low as possible.

According to a preferred further development of the invention, the supporting member is stepped in a staircase shape. The individual steps of the supporting member can have a different width and/or height along its longitudinal course corresponding to the desired contour of the fender and/or the front opening hood. This can influence the course of the joints in all three directions in space.

Preferably, the individual connection areas of the supporting member extend approximately horizontally. A slight deviation from the horizontal line, as a rule, is caused by the vehicle contour which normally rises slightly in the forward area. By means of the construction of two or more connection areas situated above one another for the fenders of the individual vehicle variants, it becomes possible to allow the joint between the fender and the front opening hood to extend at different levels and thus at least give the visual impression that the height of the vehicle differs in the forward area. In a similar manner, a variation of the position of the joint in the transverse direction of the vehicle provides an appearance with respect to the vehicle width. As a result, for example, in the case of sporty variants of a vehicle series, the connection of the fender can take place lower and/or farther to the outside than in the case of a sedan of the same series.

In addition to the above-described variation of the height and width position of the separating line, the course of the separating line can naturally be influenced in all three directions in space, using correspondingly designed fenders and front opening hoods while the supporting members are uniform.

The invention can preferably be used in the forward area of a motor vehicle. For the purpose of a linguistic simplification, the wording of the claims is therefore limited to fenders and front opening hoods. However, in principle, the wording of the claims also comprises supporting members for the rearward area of vehicles in the same manner as vehicles which have a correspondingly designed rearward area for a uniform supporting member with several connection areas for the rearward side wall areas, the upper end sections of the side wall areas directly adjoining a rear opening of such a vehicle.

A possible embodiment of the invention is illustrated in the drawing and will be described in detail in the following.

BRIEF DESCRIPTION OF THE DRAWINGS

FIGS. 1 and 3 are perspective views of a partially sectional forward vehicle structure with a high-set and a low-set fender respectively; and FIGS. 2 and 4 are vertical sectional views of the forward vehicle structures of FIGS. 1 and 3 respectively, with a high-set and a low-set fender in a cross-sectional view.

DETAILED DESCRIPTION OF THE DRAWINGS

Figure 1:
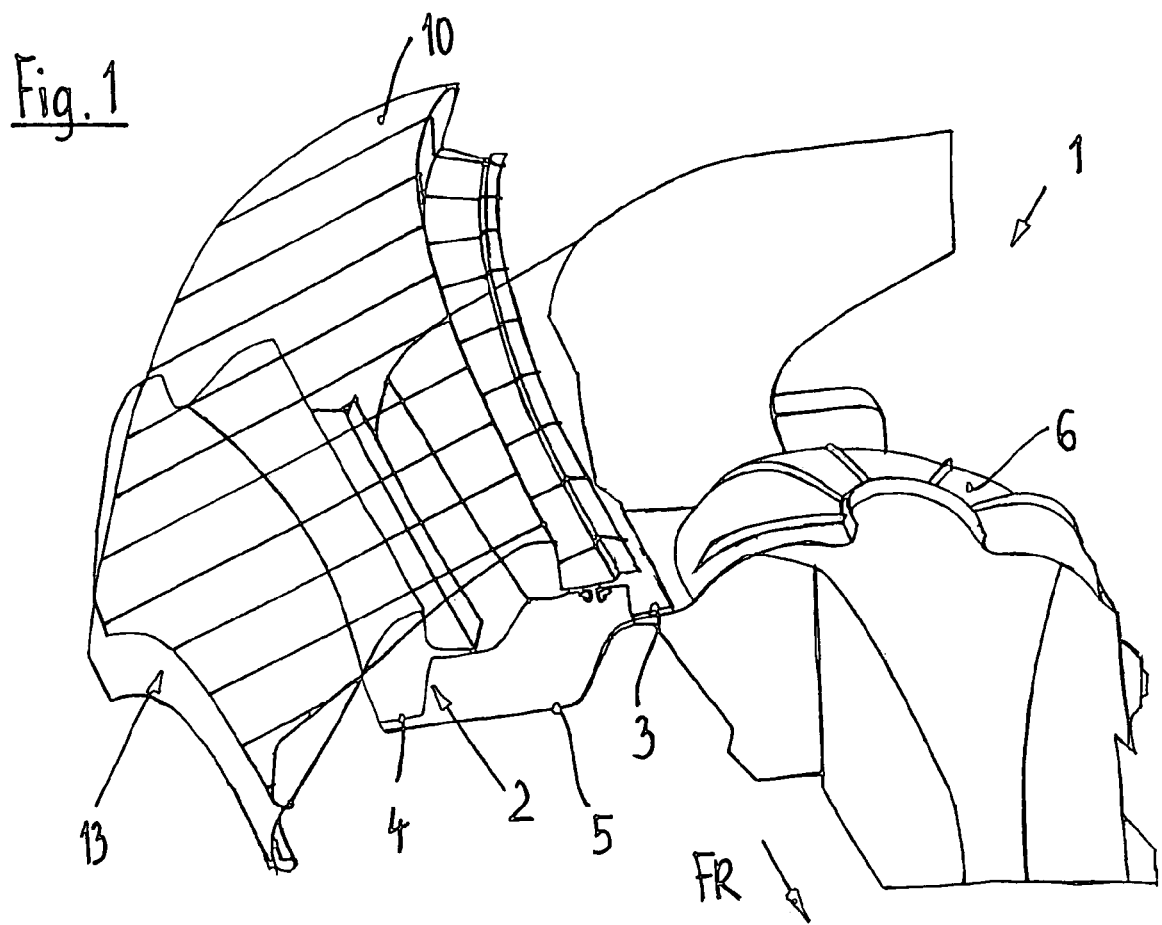

Viewed against the driving direction FR, FIGS. 1 and 3 each show a portion of a forward vehicle structure 1 which is laterally covered by a first fender 10 (shown in a shaded manner in FIG. 1) and by a second fender 20 (shown in a shaded manner in FIG. 3). In each case, the differently designed fenders 10 and 20 cover a uniform forward vehicle structure 1 with uniform supporting members 2. Each supporting member 2 is placed by means of a lower and an upper flange 3 and 4 on a bearing structure 5. The bearing structure comprises, among other things, a strut receiving device 6 which is illustrated in FIGS. 1 and 3 in a partially sectional view.

Figure 2:
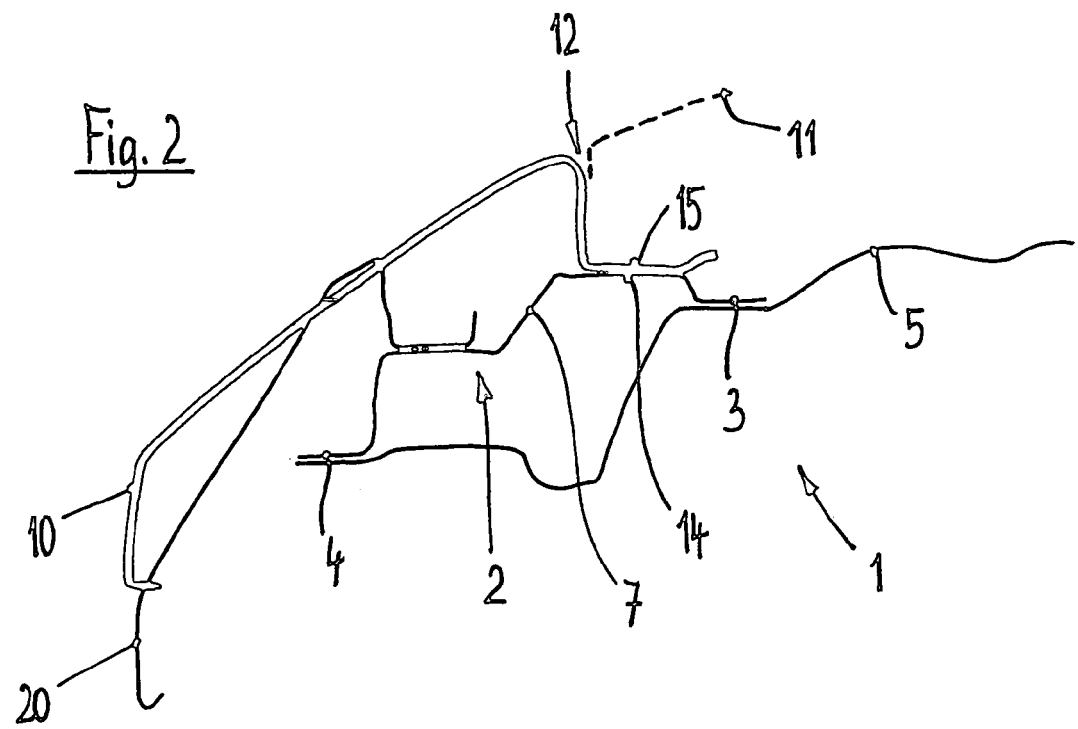

FIGS. 2 and 4 are cross-sectional views of the forward vehicle structure 1 of FIGS. 1 and 3, with the first fender 10 (illustrated in FIG. 2 by a thick line), the second fender 20 (illustrated in FIG. 4 by a thick line) and the adjoining front opening hoods 11 and 21 (being schematically illustrated by broken lines). The forward vehicle structures 1 with the corresponding pairings of the fender 10 and the front opening hood 11 as well as the fender 20 and the front opening hood 21 are assigned to different vehicle variants, as, for example, to a sedan or a coupe, which are based on the same undercarriage. In this case, despite uniform side members 2, different courses of joints 12 and 22 are achieved in all three directions in space for the two vehicle types. The "sedan" vehicle variant has the higher design of the fender 10 and the front opening hood 11, while the "coupe" variant has lower-set fenders 20 as well as a correspondingly adapted front opening hood 21. The joints 12 and 22 extend in a vertically as well as laterally offset manner. The wheel openings 13 and 23 in the fenders 10 and 20 extend at different levels in the case of both vehicle variants.

The uniform supporting member 2 is stepped in a staircase shape, with essentially horizontally extending connection areas 14 and 24. These connection areas 14 and 24 are situated above one another in a laterally offset manner, the upper connection area 14 in its rearward area facing away from the driving direction being pulled in slightly inward in the direction of the center of the vehicle. The corresponding connecting flanges 15 and 25 of the fenders 10 and 20 are placed on the connection areas 14 and 24. The two connection areas 14 and 24 of the supporting member 2 are connected with one another by means of a diagonally extending flank 7.

Naturally, the supporting member 2 may also have a design which deviates from the illustrated staircase shape. More than two connection areas may also be provided. While, in the case of the above-described embodiment, the connection areas 14 and 24 extend essentially in mutually parallel horizontal planes, the planes of the two connection areas naturally may also extend obliquely to one another.

What is claimed is:

1. A backing girder for fenders of a vehicle, comprising:
    a supporting member having upper and lower flanges for attachment to a bearing structure of the vehicle, for forming a closed box structure therewith;
    at least two attachment areas of the backing girder, formed on the supporting member, providing attachments for at least two corresponding different fenders;
    a first one of the attachment areas being offset from a second one of the attachment areas, the at least two different fenders being attachable to directly adjoin corresponding different front hoods of the vehicle; wherein
    the at least two attachment areas are offset in relation to one another in at least one of a height and width direction of the vehicle, resulting in vehicle variants in which one of the at least two different fenders is attachable lower and further outboard in one vehicle variant than another of the at least two different fenders in another vehicle variant.

2. The backing girder according to claim 1, wherein the backing girder is configured to provide an attachment to upper end sections of the at least two different fenders.

3. The backing girder according to claim 1, wherein the first and the at least second attachment areas form a stepped staircase-like structure.

4. The backing girder according to claim 1, wherein the first and the at least second attachment areas extend substantially horizontally.

5. The backing girder according to claim 1, wherein each of the at least two fenders is attachable to adjoin a different hood having a different join curve, each different hood corresponding to a different vehicle variant.

6. The backing girder according to claim 5, wherein the different vehicle variant comprises one of a sedan variant and a coupe variant.

7. A vehicle having multiple vehicle variants, comprising:
    a backing girder;
    a supporting member having upper and lower flanges for attachment to a bearing structure of the vehicle, for forming a closed box structure therewith;
    at least two attachment areas of the backing girder, formed on the supporting member, providing an attachment for at least two corresponding different fenders, a first one of the attachment areas being offset lower and further outboard from a second one of the attachment areas; wherein
    the at least two different fenders are each attachable to a different one of the at least two attachment areas, for directly adjoining corresponding different front hoods of the multiple vehicle variants, thus forming different join curves thereof.

8. The vehicle according to claim 7, wherein one of the different fenders is attachable to one of the two attachment areas which is offset upward and outward from another of the at least two attachment areas, thus defining a sedan vehicle variant having a higher fender and front hood configuration.

9. The vehicle according to claim 7, wherein one of the different fenders is attachable to one of the two attachment areas which is offset downward and inward from another of the at least two attachment areas, thus defining a coupe vehicle variant having a lower fender and front hood configuration.

10. The vehicle according to claim 7, wherein the different fenders are each attachable to a different one of the at least two attachment areas, to directly adjoin corresponding different front hoods of the multiple vehicle variants thus forming different join curves at upper end areas of the fenders.

11. The backing girder according to claim 1, wherein the bearing structure of the vehicle comprises a strut receiving device.

12. The vehicle according to claim 7, wherein the bearing structure of the vehicle comprises a strut receiving device.

13. The backing girder according to claim 1, wherein supporting member and the bearing structure form a closed beam structure.

14. The vehicle according to claim 7, wherein supporting member and the bearing structure form a closed beam structure.

* * * * *